United States Patent [19]

Aizawa et al.

[11] 4,227,787
[45] Oct. 14, 1980

[54] BULB PHOTOGRAPHING CONTROL SYSTEM FOR AN ELECTRIC SHUTTER CAMERA

[75] Inventors: Hiroshi Aizawa, Kawasaki; Masami Shimizu, Tokyo; Masanori Uchidoi, Yokohama; Tokuichi Tsunekawa, Kanagawa; Yukio Iura, Yokosuka; Masayoshi Yamamichi, Kawasaki, all of Japan

[73] Assignee: Canon Kabushiki Kaisha, Tokyo, Japan

[21] Appl. No.: 3,530

[22] Filed: Jan. 15, 1979

Related U.S. Application Data

[63] Continuation of Ser. No. 763,718, Jan. 28, 1977, abandoned.

[30] Foreign Application Priority Data

Feb. 4, 1976 [JP] Japan .................................. 51/10998

[51] Int. Cl.³ .......................... G03B 7/097; G03B 9/62
[52] U.S. Cl. ..................................... 354/51; 354/234; 354/267

[58] Field of Search ..................... 354/23D, 32, 50, 51, 354/266, 267, 60 R, 234, 235, 238

[56] References Cited

U.S. PATENT DOCUMENTS

| | | | |
|---|---|---|---|
| 3,988,748 | 10/1976 | Iura et al. ........................... | 354/51 X |
| 4,015,198 | 3/1977 | Iwashita et al. ................. | 354/234 X |
| 4,037,234 | 7/1977 | Tunekawa et al. ................ | 354/50 X |
| 4,062,028 | 12/1977 | Tezuka et al. ....................... | 354/152 |

Primary Examiner—Michael L. Gellner
Attorney, Agent, or Firm—Toren, McGeady and Stanger

[57] ABSTRACT

When an electric shutter camera is set at a bulb photographing mode, which camera has an electro-magnetic release which places a photo-sensing circuit in an active state by a photo-sensing switch associated with a first stroke of a shutter button and provides shutter release by a camera-initiating switch associated with the second stroke of the shutter button, shutter release is performed by the camera-initiating switch and at the same time, the retention of a shutter follower screen is released in association with the photo-sensing switch to complete bulb photographing action.

6 Claims, 6 Drawing Figures

BULB PHOTOGRAPHING CONTROL SYSTEM FOR AN ELECTRIC SHUTTER CAMERA

This is a continuation of Ser. No. 763,718, filed Jan. 28, 1977, now abandoned.

BACKGROUND OF THE INVENTION

1. Field of the Invention

The present invention relates to a bulb photographing control system in a bulb photographing mode of an electric shutter camera which provides various photographing actions by opening and closing an electric switch by operating a shutter button.

2. Description of Prior Art

In a bulb photographing control system used in a conventional electric shutter camera, when said camera is set at bulb photographing mode, a switch (a bulb photographing switch) associated with a shutter bulb is provided at a charging path to an integration capacitor of a shutter time control circuit. As long as the shutter button is pressed, the capacitor is short-circuited through said switch thereby blocking the charging. The switch, is turned OFF by releasing the pressing of the shutter button to conduct the charging of the capacitor, thus allowing the bulb photographing by releasing the retention of the shutter following screen.

Since bulb photographing must be done without hand shaking as a matter of course the handling of a shutter button needs to be done with special care. Therefore a photographer should perform the pressing of the shutter button with as light a touch and as small a force as possible.

The shutter release for conventional cameras has been arranged to mechanically transmit a motion initiated by a shutter release button depressing action of a photographer to each member concerned to perform the diaphragm aperture control, mirror lifting and shutter front diaphragm running actions of the camera. Since the conventional camera is thus arranged to transmit a release button depressing motion to each member through a mechanical linkage, the depressing stroke of the shutter release button is long and heavy. This tends to cause shaking of the camera when a shutter release operation is performed.

To eliminate such a shortcoming of the mechanical shutter release of conventional cameras, there have been proposed some cameras in which the conventional means for carrying out shutter release is replaced by electromagnetic means. With such electromagnetic means, the shutter release button can be operated with a much smaller force than the conventional mechanical linkage arrangement. Knowing such an advantage of the electromagnetic means, however, photographers sometimes stop the shutter release button depressing operation halfway without depressing the button to its full stroke in fear of shaking of their hand. In the case of bulb photographing, such immature ending of a shutter release operation presents a serious problem, because a shutter release button must be depressed for a longer period of time. With the employment of such an electro-magnetic means, if the shutter release button operation is stopped halfway, depressing of the shutter release button is undone by a slight variation in the finger tip pressure exerted thereon. This results in a premature ending of the bulb photographing operation.

BRIEF SUMMARY OF THE INVENTION

Objects of the Invention

An object of the present invention is to precisely conduct bulb photographing of an electric shutter camera.

Another object of the present invention is to eliminate uncertain action at the time of bulb photographing in an electric shutter camera, of such electro-magnetic release type that a photo-sensing circuit is activated by a photo-sensing switch associated with a first stroke of a shutter button and shutter release is performed by a camera-initiating switch associated with a second stroke of the shutter button.

Other and further objects of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENTS

Now the present invention shall be explained in detail with reference to the attached drawings.

Figure 1:
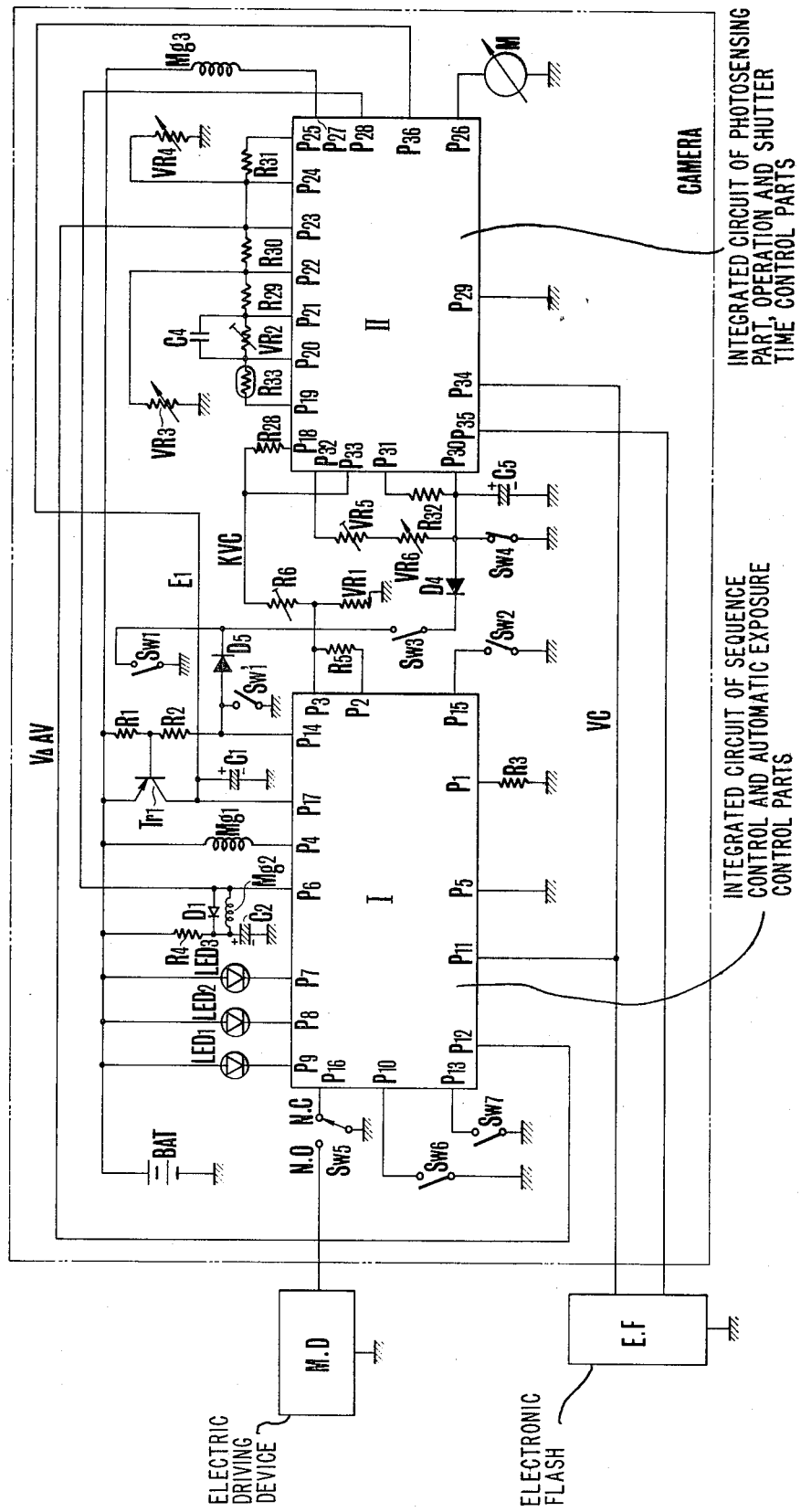
FIG. 1 is a block diagram to show an example of a camera using a bulb photographing control system of the present invention.

FIG. 1 is a block diagram to show an example of a camera to which a bulb photographing control system according to the present invention is applied, wherein the portion enclosed by broken line is a circuit set up built in a camera main body. In said drawing, what is shown as MD is an electric driving device and what is shown as EF is an electronic flash device, both of which can be mounted on a camera as necessary. What is shown as I in the circuit of the camera is an integrated circuit (LSI) constituting a sequence control part and an automatic exposure control part, while $P_1$ to $P_{17}$ show terminals for input and output of said integrated circuit I and for connection to individual parts outside of the circuit.

What is shown as II is an integrated circuit (LSI) constituting a photo-sensing part, an operation part and a shutter time control part, wherein $P_{18}$ to $P_{36}$ are terminals for input and output thereof and for each component part outside of the circuit. What is shown as M is an information display meter, and $Mg_1$, $Mg_2$, $Mg_3$ show electro-magnets, respectively, while $Tr_1$ is a transistor of a circuit to retain a source of power supply, and $LED_1$ to $LED_3$ are light-emission diodes for display purpose, while $Sw_1$ to $Sw_7$ are switches and $VR_1$ to $VR_6$ are variable resistances for information setting and for other purposes, and BAT is a power source battery.

In said drawing, $Sw_1$, representing a first switch means, is a switch which becomes ON by a first stroke of a shutter release action, and shutter release switch $Sw_2$ is a switch which becomes ON by a second stroke of a shutter release action, while bulb switch $Sw_3$ is a switch which becomes ON at a time of bulb exposure, and $Sw_4$ is a counting switch which becomes OFF as a shutter is released, while $Sw_6$ is a change over switch for automatic-manual photographings and becomes ON at a time of manual. What is shown as $Sw_7$ is a switch for a self timer photographing and becomes ON when a self timer is used. What is shown as $Sw_5$ is a switch to alternately change over a film wind up action and a photographing action of a camera when photographing is done using the electric driving device MD, and is changed over to N.C. side by completion of wind up and is changed over to N.O. side by completion of running of a shutter follower screen. What is shown as $Mg_1$ is a magnet for automatic exposure control, and $Mg_2$ is a magnet for initiating a camera action, while $Mg_3$ is a shutter time control magnet.

In a camera shown in FIG. 1, photo-sensing, operation and shutter time control are done in an analogical manner by the circuit element II, while diaphragm control for automatic exposure and sequential control of various photographing modes are done digitally by the circuit element I. Detailed explanations of said actions will be made as the detailed circuit diagrams shown in FIG. 2 and 3 are explained.

Figure 2:
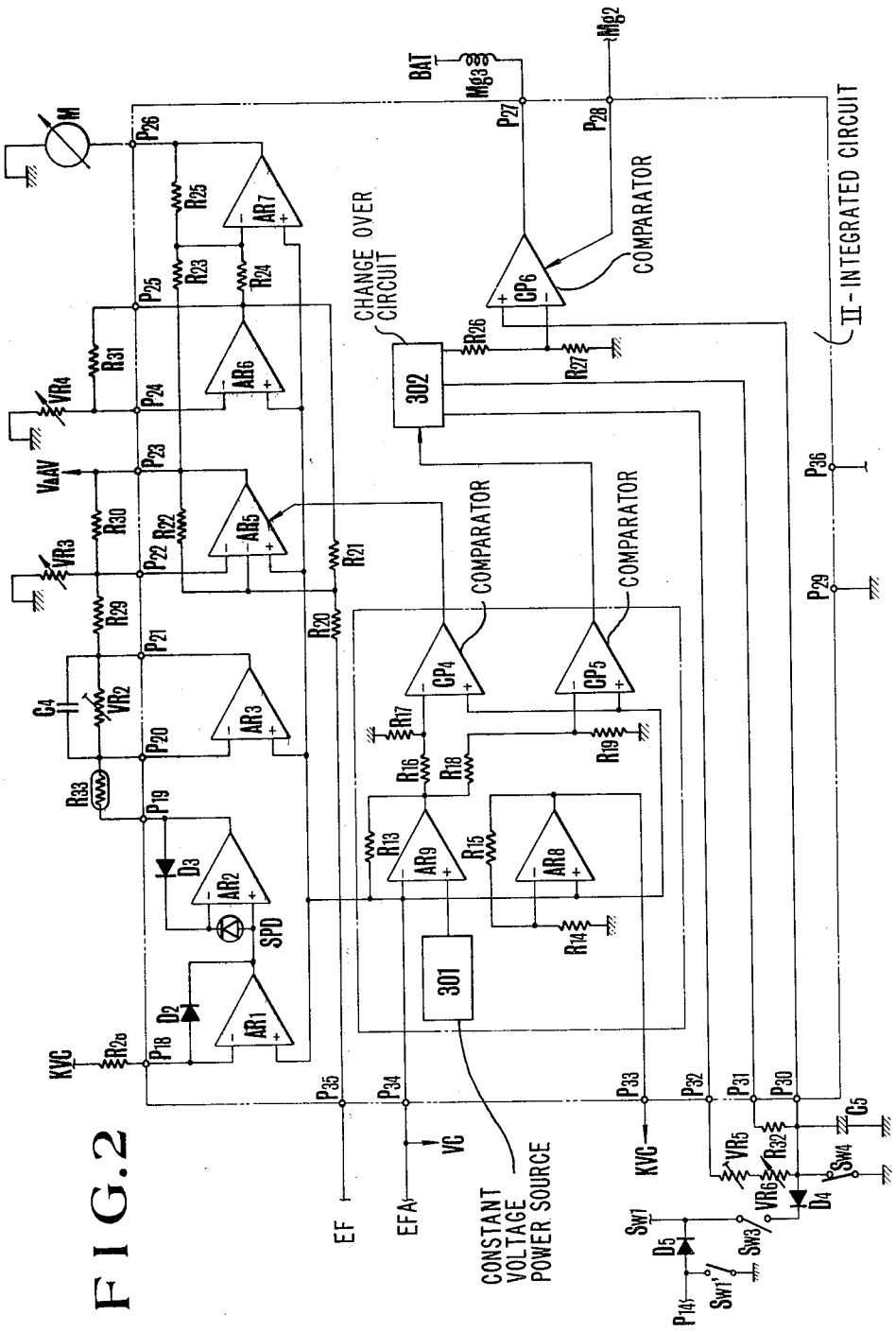
FIG. 2 is a circuit connection diagram to show details of the circuit II in FIG. 1.
Figure 3:
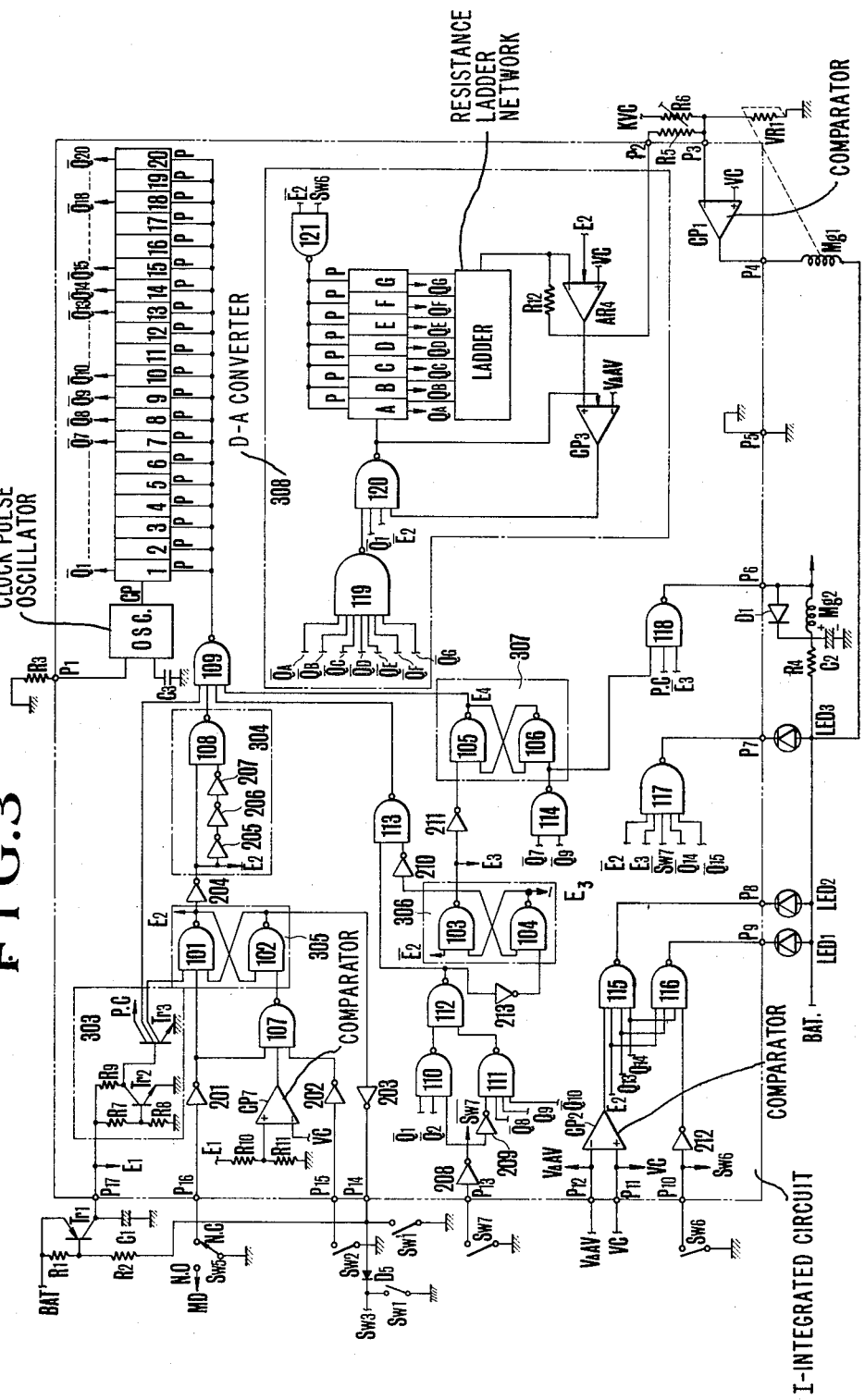
FIG. 3 is a circuit connection diagram to show details of the circuit I in FIG. 1.
Figure 6:
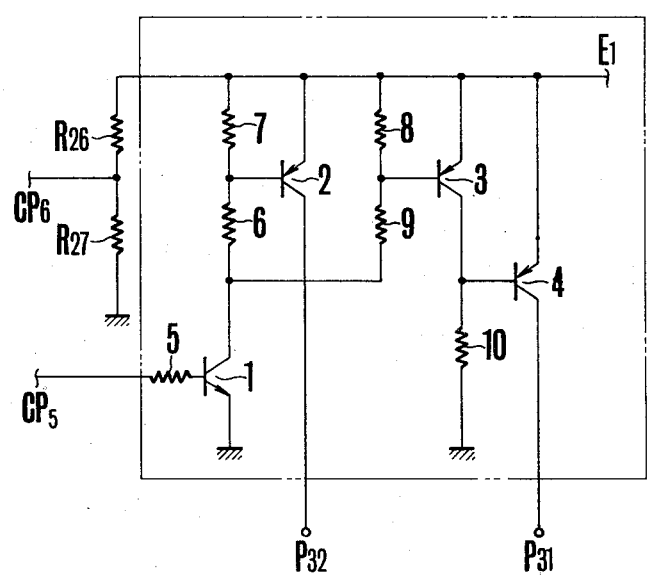
FIG. 6 is a detailed diagram of a change over circuit in FIG. 2.

FIG. 2 is a circuit connection diagram to show an example of a photo-sensing part, an operation part and a shutter time control part of a camera according to the present invention, wherein the part II enclosed by broken line is constituted for example by such integrated circuit as LSI, and outside parts and input and output connection and a power source are connected to said part II by terminals $P_{18}$ to $P_{36}$. In said drawing, $AR_1$ to $AR_9$ are operation amplifiers and $CP_4$ to $CP_6$ are comparators, wherein $AR_5$ and $CP_6$ are controlled by control inputs (shown by arrow marks). What is shown as 301 is a constant voltage power source and 302 is a change over circuit which consists of four transistors 1 to 4 and bias resistances 5 to 10 of said transistors as shown in FIG. 6, and the output of the comparator $CP_5$ is connected to the base of the transistor 1 through the resistance 5, while the collectors of the transistors 2 and 4 are connected to the terminals $P_{32}$ and $P_{31}$ respectively. Therefore, when the output of the comparator $CP_5$ is at a high level the transistors 1 to 3 becomes ON and the transistor 4 becomes OFF, thus voltage is impressed on the terminal $P_{32}$, and when the output of the comparator $CP_5$ is at a low level, the transistors 1 to 3 becomes OFF and the transistor 4 becomes ON, thus voltage is impressed on the terminal $P_{31}$. SPD is a silicon photo-diode for photo-sensing, and $D_3$ is a log diode to obtain logarithmic compression characteristics. Now, to explain outside parts, $R_{33}$ is a posistor, $C_4$, $VR_2$ show a circuit to eliminate sudden variation in photo-sensing value by flicker of a light source to illuminate an object, $VR_3$ is a variable resistance to set shutter time information and a film sensitivity information, $VR_4$ is a variable resistance for inputting the correction information for fully opened F value of lens, M is a display meter, $VR_5$ is a variable resistance for shutter time adjusting at a time of high speed shutter, $VR_6$ is a variable resistance for setting shutter time, and $C_5$ is a capacitor of a time constant circuit $VR_5$, $VR_6$ and $C_5$ form a time constant circuit.

Next, explanations will be made on the function of the circuit shown in FIG. 2. This circuit is placed in an active state as power is supplied by a power battery (BAT shown in FIG. 1) to between the terminals $P_{36}$, $P_{29}$ through a power supply retention circuit. Light beam from an object impinges into a photo-electromotive element SPD for light receiving through a photographing lens of a camera, and SPD generates such photo-current as corresponding to an object brightness. The signal of said current is amplified by the operation amplifier $AR_2$ having a logarithmic characteristic element $D_3$ at its feed-back path and brightness information (BV) is generated at the output thereof. The operational amplifier $AR_1$ having a diode $D_2$ with same characteristics as that of $D_3$ at its feed back-path is provided; also the posistor $R_{33}$ is provided at output side to compensate for the variation by temperature of the log diode $D_3$. Also, the output from the $AR_2$ is inputted into the operational amplifier $AR_3$ through the posistor $R_{33}$, and the high frequency element of the signal is damped by the characteristics of $C_4$, $VR_3$ at said amplifier, thus the above mentioned output variation by flicker is eliminated. The brightness information (BV) from $AR_3$ is supplied an inversion input terminal of the operational amplifier $AR_5$ through the resistance $R_{29}$. And the shutter time information (Tv) and the film sensitivity information (Sv) are set at the variable resistance $VR_3$ and supplied to said terminal of the $AR_5$ and is operated at $AR_5$. The stop down step number information $V_{\Delta AV}$ is provided as an input at the output of $AR_5$ and is taken out of the terminal $P_{23}$ then is sent to the sequence control and automatic exposure control circuit I as shown in FIG. 1. This stop down step number information $V_{\Delta AV}$ is synthesized with the output of the fully opened F value information (Avo) of lens being set at $VR_4$ by $AR_6$ and is supplied to $AR_7$, and such information (Av) corresponding to the diaphragm aperture value is obtained at said output, then the same is displayed by a diaphragm aperture value display meter M for example within a finder, etc. When the magnet $Mg_2$ which conducts the starting action of a camera is magnetized, the signal thereof is sent to the comparator $CP_6$ from the terminal $P_{28}$ to control $CP_6$, and the magnet $Mg_3$ is magnetized by the output from $P_{27}$ to hold the shutter follower screen. Magnet $Mg_3$ and comparator $CP_6$ form an actuating means. As the switch $Sw_4$ becomes OFF in association with the start of a shutter leading screen, the charging of the capacitor $C_5$ is started through the resistances $VR_5$, $VR_6$ of the time constant circuit, and the terminal voltage thereof is impressed into the non-inversion input of the comparator $CP_6$. Said signal and the reference voltage which is obtained as the constant voltage from the change over circuit 302 is divided are compared at $CP_6$, and when they coincide with each other, $CP_6$ is inversed and $Mg_3$ which has held the follower screen is demagnetized thus the follower screen runs. As a braking power works on the follower screen the change over switch $Sw_5$ shown in FIG. 1 is changed over to N.O. side and the circuit is reset. The circit enclosed with chain-and-dot-line is to conduct such diaphragm control as corresponding to the distance information at a time of stroboscopic photographing by EF, and the change over of the shutter time to the specific shutter time for stroboscopic photographing, and $AR_5$ and the change over circuit 302 are controlled by the output thereof.

That is, when the input terminal $EF_A$ has gained grounding level in correspondence with the charging completion signal of a flash device, current flows out of the inversion input terminal $P_{34}$ of the amplifier $AR_9$ and the output voltage of the amplifier $AR_9$ will become high level, then the output of the comparator $CP_4$ will become low level in correspondence therewith and is impressed on the amplifier $AR_5$ and the shutter time change over circuit 302. Therefore, the diaphragm control system responds to the diaphragm signal for flash photographing supplied through $P_{35}$ from the flash device, and the shutter speed is set at the shutter speed for flash photogaphing (for example 1/60 sec.) by the action of the change over circuit 302, that is, an automatic change over to a flash photographing mode is done.

FIG. 3 is a circuit connection diagram to show the details of the part of the circuit I in FIG. 1. This drawing is intended to show an example of a sequence control part and an automatic exposure control part of a device according to the present invention, wherein the portion enclosed by broken line is constituted as LSI. The circuit is constituted as a digital control circuit, wherein $P_1$ to $P_{17}$ are terminals of the LSI to which such individual outside parts or circuits as shown in the drawing are connected. In this drawing, what is shown as 1 to 20 are binary counters, and P is a preset input terminal, while $\overline{Q}_1 \ldots Q_9 \ldots \overline{Q}_{20}$ are output terminals and CP is a clock pulse input terminal. That is when input P has the logic of "1", $Q_n$ becomes "1", while $\overline{Q}_n$ becomes "0". What is shown as OSC is a clock pulse oscillator which oscillates clock pulse with such cycle as determined by the time constant of the resistance $R_3$ and the capacitor $C_3$. What is shown as 308 is an AD-DA convertor, wherein A to G show binary counters thereof and LADDER LAD is a resistance circuit network. What is shown as 303 is a power up clear circuit and what is shown as 304 is a one shot circuit, while what are shown as 305, 306 and 307 are flip-flop circuits, respectively, and what are shown as 101 to 121 are NAND gates, while what are shown as 201 to 213 are inverters, and $AR_4$ is an operation amplifier, while $CP_1$, $CP_2$, $CP_3$ and $CP_7$ are comparators.

Next the function in FIG. 3 will be explained.

(1) a state wherein a camera has its wind up completed and a first stroke of release is done. Upon completion of wind up action the switch $Sw_5$ is changed over from N.O. to N.C. Also by the pressing down in the first stroke the switch $Sw_1$, becomes ON and the transistor $Tr_1$ of the power supply circuit becomes On thus the circuits are placed in an active state. ($E_1$ is "1"). What clock pulse is supplied from OSC to the counters and $E_1$ is supplied to the circuits in this state, the output of the power up clear 303 momentarily becomes "0" and the output of NAND 109 becomes "1", thus the counters are preset. Also the flip-flop (FF) 305 is placed at its initial state, that is $E_2$ is preset at "1". FF306 is set at its initial state by the inversion output $\overline{E}_2$ of $E_2$ and the output $E_3$ becomes "1". Also FF307 is set at its initial state by the inversion output $\overline{E}_3$ of $E_3$ and the output $E_4$ is set at "1". By this the preset input of the AD-DA converter 308 that is the output of NAND 121 becomes "1" and the counters A to G are preset. Also since $E_2$ is "1", the operation amplifier $AR_4$ is controlled thereby and its output is connected to grounding. Therefore the magnet $Mg_1$ for automatic exposure control (AE) will not be magnetized in this state. By the above in the state of (1), $E_1$, $E_2$, $E_3$ and $E_4$ becomes all "1".

(2) When a camera is used in a manual photographing mode in the state of (1), the switch $Sw_6$ is placed in ON state. As $Sw_6$ becomes ON the output of the invertor (Iv) 212 becomes "1", and the input of NAND 116 all becomes "1" when the outputs $\overline{Q}_{13}$ and $\overline{Q}_{14}$ of the counters both become "1", thus 116 outputs "0". By this output is generated at the light emission diode LED 1 through the terminal $P_9$, and said diode is lighted to indicate the manual mode.

(3) When the light beam from an object is below the reference value:

In this case the stop down step number information $V_{\Delta AV}$ from the photo-sensing circuit inputted into the terminal $P_{12}$ becomes below the reference voltage Vc ($V\Delta AV < Vc$). Therefore the output of the comparator $CP_2$ becomes "1", and the input of NAND 115 all become "1" when both the $\overline{Q}_{13}$ and $\overline{Q}_{14}$ become "1", thus the output of 115 becomes "0". By this the light emission diode LEd 2 connected to the terminal $P_8$ is lighted to make a warning display of low brightness. The light emission of these LED's is flickered by the cycle of the counters and is displayed for example within a finder.

(4) When the photographing action is started by handling the second stroke of release from the state of (1), the switch $Sw_2$ becomes ON thereby. As the $Sw_2$ becomes ON, the output of Iv 202 becomes "1", also the output of Iv 201 becomes "1". In this state the divided voltage of the voltage $E_1$ of the power source and the constant voltage Vc are compared by the comparator $CP_7$, and when the divided voltage value of $E_1$ is sufficiently high as compared with Vc (as the power source voltage is sufficient), the output of $CP_7$ becomes "1". By these signals the input of NAND 107 all become "1" and 107 outputs "0".

Thus FF 305 is inverted and its output $E_2$ is changed from "1" to "0". By this the output of Iv 203 becomes "0" from "1" and the base resistances $R_1$, $R_2$ of $Tr_1$ are connected to the grounding through the terminal $P_{14}$, therefore even if the switch $Sw_1$ becomes OFF, the $Tr_1$ is retained in ON state thus power supply to the circuits is retained. Therefore, since $E_2$ becomes "0", the output $\overline{E}_2$ of Iv 204 becomes "1" and the output of the one shot circuit 304 becomes "1" as long as the delay time by Iv 205, 206, 207, thus the output of NAND 109 momentarily becomes "0" and the counters 1 to 20 are preset again to start the counting of clock pulse from CP. Also as $E_2$ becomes "0", the control of the operational amplifier $AR_4$ of the AD-DA converter 308 is released and the output of $AR_4$ is offed from the grounding. By this the magnet $Mg_1$ for AE is magnetized and the locking of $VR_1$ associated with $Mg_1$ is released thus the AE action by $VR_1$ is done. In this state the signal of the output $\overline{Q}_1$ of the counter 1 is transmitted to the counters A to G of the AD-DA converter through NAND 120 the elements referred to above constitute the power supply holding circuit.

(5) When the device is changed over to a manual mode in said state ($Sw_6$ is ON), the output of NAND 121 of the converter 308 becomes "1" and the counters A to G retain a preset state. Also when the device is changed over to an automatic photographing mode ($Sw_6$ is off), the output of NAND 121 becomes "0" from "1" and the counters A to G starts the counting. When the output of the operational amplifier $AR_4$ comes down stepwise and becomes equal to the signal $V_{\Delta AV}$ from the photo-sensing circuit, the converter $CP_3$ is inverted to output "1" and NAND 120 is offed, thus the counting action of the counters A to G is stopped. Also by controlling $CP_3$ by the output of NAND 120 the effect by the noise at the time of the counting of the counters is eliminated.

(6) When a self-timer is used in the state of (4), the switch $Sw_7$ is in ON-state and the output of Iv 208 is "1", thus when both the counter outputs $\overline{Q}_{18}$ and $Q_{20}$ become "1", the output of NAND 110 becomes "0" from "1". By this NAND 112 outputs "1" and the output of Iv 213 becomes "0" thus FF 306 is inversed and its output $E_3$ becomes "0" from "1". Therefore, NAND 113 outputs "0" and the output of NAND 109 becomes "1", thus the counters 1 to 20 are preset again. As the counters are preset the output of NAND 109 becomes "0" thus the counting is started again. That is, when a self-timer is used, shutter time control pulse is provided with a delay of such length of time that the counters count from 1 to 18, 20.

(7) When a self-timer is not used in an automatic photographing mode, the switch $Sw_7$ is in OFF state. Therefore the output of Iv 208 is "0" and the output of Iv 209 is "1", and when the outputs $\overline{Q}_8$, $Q_9$ and $\overline{Q}_{10}$ from the counters become simultaneously "1", the output of NAND 111 becomes "0" from "1". By this the output $E_3$ of FF 306 is inversed from "1" to "0" when $\overline{Q}_8$, $Q_9$ and $\overline{Q}_{10}$ all become "1". That is when a self-timer is not used $E_3$ becomes "0" after such length of time that the counters count from 1 to 8, 9, 10. Also as $E_2$ becomes "0" the outputs of NAND 115, 116 become "1" thus the display by LED 1 and LED 2 is put out.

As $E_2$ becomes "0", $\overline{E}_2$ becomes "1", and when $\overline{Q}_{14}$, $\overline{Q}_{15}$ both become "1" as $Sw_7$ is in OFF state while $E_3$ is "1", the output of NAND 117 becomes "0" and LED 3 is lighted through the terminal $P_7$. When it is displayed that a self-timer is used by the lighting of LED 3 and $E_3$ becomes "0" by completion of the timer action, the output of NAND 117 becomes "1", thus LED 3 is put out. As $E_3$ becomes "0" from "1" by completion of the self-timer action, the output of Iv 211 becomes "1" and the output $E_4$ of FF 307 becomes "1".

Also as $\overline{E}_3$ is "1", the output of NAND 118 becomes "0" for such length of time that the outputs $\overline{Q}_7$, $\overline{Q}_9$ of the counters both become "1", and the magnet $Mg_2$ for starting camera is magnetized thus photographing action of a camera is started. When $\overline{Q}_7$, $\overline{Q}_9$ both become "1", the output of NAND 114 becomes "0" and magnetization of $Mg_2$ is blocked.

At the same time with that FF 307 is inversed and $E_4$ becomes "0" from "1" to make the output of NAND 109 "1" and places the counters 1 to 20 in a preset state. As the counters are preset, the NAND 112 outputs "0", and the output of Iv 213 becomes "1", then FF 306 is inversed and the output $E_3$ thereof becomes "0" from "1". By the above, the camera starts photographing action, and mirror-up stop down are done, thereby the sliding piece of $VR_1$ is shifted, and when the output of $AR_4$ and the reference value $V_c$ are compared by the comparator $CP_1$ and are matched with each other, $CP_1$ is inversed to "0" to demagnetize the magnet $Mg_1$ for AE control and clamp the diaphragm thus the diaphragm aperture value of lens is determined.

When the photographing action of camera is completed the switch $Sw_5$ is changed over from N.C. side to N.O. side and at this time the wind up action is started by the electric driving device MD. In this state the output of Iv 201 becomes "0" and FF 305 is inversed, while $E_2$ becomes "1" from "0" and the output of Iv 203 becomes also "1" from "0". Therefore as the switch $SW_1'$ is in OFF state the transistor $Tr_1$ of the power supply circuit is made off, thus the retention state of power supply by power source is released. Also as $E_2$ becomes "1", $\overline{E}_2$ becomes "0" and FF 306 is inversed then $E_3$ becomes "1". By this FF 307 is inversed and $E_4$ becomes "1", while the output of NAND 109 becomes "0" from "1", and the counters 1 to 20 starts counting again, thus all states are reset.

Now the state before the photographing was started is resumed, and as the wind up action by MD is completed the switch $Sw_5$ is changed over again to NC side and the camera is returned to a preparatory state for photographing action.

When continuous photographing is done using the electric driving device MD the release of the device is retained in a pressed state, therefore $Sw_1$, $Sw_2$ retain ON state. Therefore, at the same time when $Sw_5$ becomes ON at N.C. side by completion of the wind up action the release action is done. The power supply from the power source BAT is retained with the ON of the transistor $Tr_1$ by the ON of $Sw_1$, $Sw_2$ in this state, and the output of Iv 202 becomes "1". As the $Sw_5$ becomes ON at N.C. side, the output of Iv 201 becomes "1" from "0" and FF 305 is inverted thus the camera is started by the same action as mentioned above.

Now the action of the circuits in FIG. 1 at a time of bulb photographing, which constitutes the purport of the present invention will be explained. During bulb photographing when the shutter set dial is set at the position of B, the bulb photographing switch $Sw_3$ is made ON by a commonly known means. Also the resistance $VR_5$, $VR_6$ for shutter time are set at such appropriate values as for example 1/125 sec., etc. As the shutter button is pressed down in this state, the inside mechanism and circuit of a camera function and the switch $Sw_4$ for starting the running of the shutter leading screen is made OFF.

Figure 4:
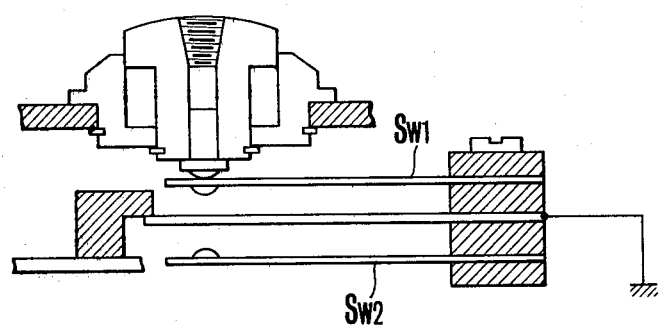
FIG. 4 is a cross-sectional view to show an example of a structure of a shutter button.
Figure 5:
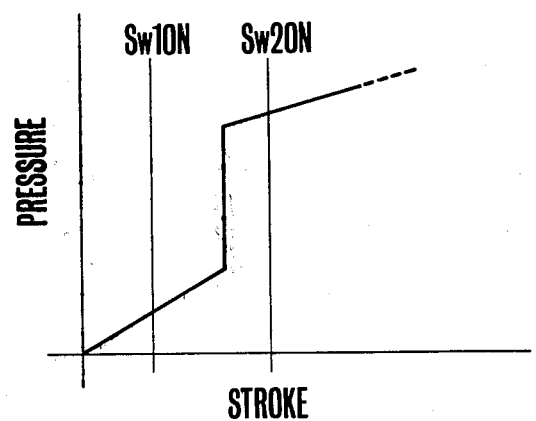
FIG. 5 is a graph to show a relationship between a stroke and a pressing power of a shutter button.

Since the current flowing from the terminal $P_{32}$ of the circuit element II through $VR_5$, $VR_6$ in this state flows to the grounding through the diode $D_4$, the switches $Sw_3$ and $Sw_1$, the time constant capacitor $C_5$ is not charged, therefore the output terminal $P_{27}$ of $CP_6$ in the circuit element II is retained at "0". Therefore the magnet $Mg_3$ for controlling the shutter follower screen is retained in magnetized state, thus the shutter retains its released state. Then as a photographer releases the pressing of the shutter button after an elapse of a desired length of time, the switches $Sw_2$, $Sw_1$ become OFF in said order, and as $Sw_1$ becomes OFF, the short-circuited state of the capacitor $C_5$ is released, then $C_5$ is charged through $VR_5$, $VR_6$ from the terminal $P_{32}$ and at this time $CP_6$ is inversed at the potential of the terminal $P_{30}$ of the circuit element II with the time constant (for example 1/125 sec.) of the time constant circuit, and its output terminal $P_{27}$ becomes "1". By this the magnet $Mg_3$ is demagnetized and the retention of the shutter follower screen is released thus the shutter is closed. Thus a bulb photographing is done. Also a switch $Sw_1'$ for photo-sensing only which is provided separately from the shutter release button is provided at the connection point of $Sw_3$ and $Sw_1$ together with the diode $D_5$ to prevent interference between $Sw_1$ and $Sw_1'$ at a time of bulb photographing by one way directivityy of the diode $D_5$. FIG. 4 is a cross sectional view to show an example of the positions of the shutter button and the switches $Sw_1$, $Sw_2$ of camera according to the system of the present invention, and FIG. 5 is a graph to show the relationship between the stroke and the pressing of the shutter button of a structure shown in FIG. 4.

As has been mentioned above, in an electric shutter camera using a bulb photographing control system of the present invention, such shortcoming as closing a shutter unintentionally at a time of bulb photographing can be prevented. Further, the handling touch of a shutter button, which is one of the important elements in photographing with this kind of camera, can be secured in a satisfactory manner without being impaired, thus the invention has great practical effect.

What is claimed is:

1. A bulb photographing control system, comprising:
   (A) photo-sensing circuit means for receiving object light and for generating an electrical signal corresponding thereto for measuring object brightness;
   (B) first switch means which is connected to the photo-sensing circuit means and which places the photo-sensing circuit means in an active state by the first step action of a shutter release;
   (C) computing means which computes the exposure information on the basis of object brightness information from the photo-sensing circuit in correspondence with the closing action of the first switch means;
   (D) shutter control means which is actuated by the closure of a shutter release switch and which is operated by a second step operation of the shutter release, said shutter closing control means having a time control circuit for controlling the operation time of the shutter;
   (E) a power supply holding circuit provided with a shutter release switch which closes after the first switch means is closed by depression of a shutter release button and power supply holding means for maintaining power supply to each of the above stated means after the shutter release switch is closed; and
   (F) bulb photographing control means having a bulb switch, positioned between said time control circuit and said first switch means, for selecting bulb photographing and normal photographing, and being designed to prevent generation of actuation signals from the time control circuit by closure of the bulb photographing switch, and to close the shutter by the actuation signal from the time control circuit after the closure of the first switch means.

2. A system according to claim 1, including a third switch which is connected in parallel with said first switch means and separated by a diode.

3. A bulb photographing control system according to claim 2, in which a diode is provided between the bulb photographing switch and the time control circuit.

4. A bulb photographing control system comprising:
   (A) an electric shutter camera including:
      (1) first switch means which closes by a first step of shutter release operation and a second switch means which closes by a second step of shutter release operation;
      (2) photo-sensing circuit means which measures light amount of an object brightness information by the closure of the first switch means;
      (3) shutter operation control means for closing and controlling the shutter, having time control means which controls the operation time of the shutter after closure of the second switch means; and
      (4) a shutter closing member which operates according to a closing signal from the time control means; and
   (B) bulb photographing control means including:
      (1) third switch means, positioned between the time control means and the first switch means, to select bulb photographing and normal photographing; and
      (2) so that generation of the closing operation signal from the time control means to the shutter closing member is prevented by forming an open circuit together with the first switch means by the closing operation of the third switch means, and the closing operation of the shutter closing member is effected by the opening operation of the first switch means on the basis of signals from the time control means.

5. A bulb photographing control system comprising:
   (A) an electric shutter camera including:
      (1) first switch means actuated by a first step of shutter release operation and a second switch means actuated by a second step of the shutter release operation;
      (2) time control means for controlling shutter operation time after the actuation of the second switch means; and
      (3) a shutter closing member controlled by an operation signal from the time control means; and
   (B) bulb photographing control means having third switch means which prevents generation of an actuation signal of the time control means in cooperation with the first switch means.

6. A bulb photographing control system according to claim 5, in which a diode is provided between the time control means and the third switch means.

* * * * *